United States Patent Office 3,017,378
Patented Jan. 16, 1962

3,017,378
RUBBER COMPOSITIONS
Verne G. Simpson, Scotia, N.Y., assignor to General Electric Company, a corporation of New York
No Drawing. Filed Oct. 28, 1960, Ser. No. 65,578
5 Claims. (Cl. 260—37)

The present invention relates to improved organopolysiloxane rubber compositions and to a method for making them. More particularly, the present invention relates to a method of producing organopolysiloxane rubber compositions having improved heat-age resistance by incorporating certain aryl urethanes into reinforced organopolysiloxanes, and to the resulting rubber compositions produced thereby.

Organopolysiloxane rubber compositions are generally recognized as being more temperature resistant and less subject to decomposition than the more conventional types of synthetic or natural rubbers. A serious problem that has troubled industry is that organopolysiloxane rubber compositions often become brittle and lose many of their desirable qualities after extensive use at elevated temperatures. Heat-aging of organopolysiloxane rubber compositions can be reduced by incorporating into the polymer effective amounts of materials such as red iron oxide during the manufacturing stages. As a result, the useful life of organopolysiloxane rubber compositions has been substantially increased.

While metal compounds such as red iron oxide have improved the heat-age resistance of organopolysiloxane rubber compositions, these additives often have vivid colors and frequently must be incorporated into the organopolysiloxane rubber composition in relatively high amounts to be effective. As a result it is virtually impossible to successfully tint organopolysiloxane rubber compositions containing high concentrations of these heat-age additives because the color of the additive is usually imparted to the final cured product.

It has now been discovered that by incorporating into an organopolysiloxane convertible to the cured, solid, elastic state, an effective amount of an aryl urethane having the formula:

(1)        R'OOCHN—R—NHCOOR' the resulting organopolysiloxane composition has the same color as the polymer and therefore readily tintable with standard pigments such as titanium dioxide, chromium oxide, etc., while the cured organopolysiloxane elastomer derived therefrom exhibits superior resistance to heat-aging, where R in Formula 1 is a member selected from the class of divalent arylene radicals, halogenated divalent arylene radicals, and bis-arylene substituted alkylene radicals, and R' is a member selected from the class of monovalent aryl radicals and halogenated monovalent aryl radicals.

Radicals that are included within the definition of R of Formula 1 are divalent arylene radicals such as phenylene, tolylene, naphthylene, etc.; halogenated divalent arylene radicals such as chlorophenylene etc., and bis-arylene substituted alkylene radicals having the formula:

(2)        —R''—C(R''')$_2$—R''— where R'' is a member selected from the class of divalent arylene radicals and halogenated divalent arylene radicals, such as phenylene, tolylene, naphthylene, halophenylene, etc.; R''' is a member selected from the class of hydrogen and lower alkyl radicals such as methyl, ethyl, propyl, etc. Included within the radicals represented by R' of Formula 1 are phenyl, tolyl, xylyl, naphthyl, halophenyl, etc. R, R', R'' and R''' above can represent any one of the aforementioned radicals respectively, or a mixture of two or more of the aforementioned radicals respectively. R is preferably methylene bis-phenylene, R' is preferably phenyl, R'' is preferably phenylene and R''' is preferably hydrogen.

An effective amount of a heat-age additive is an amount sufficient to impart to a cured organopolysiloxane rubber sample an improved resistance to heat-aging as compared to samples containing no heat-age additive. Heat-aging causes an alteration in the desirable physical properties of an organopolysiloxane polymer at temperatures above 150° C. over an extended period of time.

In accordance with the present invention, there is provided organopolysiloxane rubber compositions having improved resistance to heat-aging comprising (1) 100 parts of an organopolysiloxane convertible to the cured, solid, elastic state, (2) 10 to 200 parts of a filler (3) and an effective amount of an aryl urethane within the scope of Formula 1, said organopolysiloxane having a viscosity of at least 100,000 centipoises when measured at 25° C., the organic radicals of said organopolysiloxane being members selected from the class of monovalent hydrocarbon radicals, halogenated monovalent hydrocarbon radicals, and cyanoalkyl radicals, said organic radicals being attached to silicon by carbon-silicon linkages, there being an average of about 1.98 to 2.01 organic radicals per silicon atom.

The aryl urethanes that are included within the scope of Formula 1 can be derived from the base catalyzed reaction between arylhydroxides having the formula:

(3)        R'(OH)$_n$ and an aryldiisocyanate having the formula:

(4)        OCN—R—NCO where R and R' are as defined above, and n is an integer equal to from 1 to 3.

Diisocyanates that are included within the scope of Formula 4 are methylene bis(1,4-phenylenediisocyanate), tolylene diisocyanate, naphthalene diisocyanate, 3,3'-bitolylene - 4,4'-diisocyanate, 3,3'-dimethyldiphenylmethane-4,4'-diisocyanate, meta-phenylene diisocyanate, 2,4-tolylene diisocyanate dimer, dianisidine diisocyanate, diphenylxylylene diisocyanate, xylylene diisocyanate, dichloroxylylene diisocyanate, p-phenylene diisocyanate, etc. Aryl hydroxides that are included within the scope of Formula 3 are phenol, cresol, xylenol, mesitol, catechol, resorcinol, quinol, pyrogallol, phloroglucinol, etc.

The concentrations of aryl urethanes that have been found to be operable in the present invention can vary in the range of about 0.1 to 10.0 parts per 100 parts of the convertible organopolysiloxane polymer, while a preferred range is between about 0.25 to 1.0 part per 100 parts of the convertible organopolysiloxane.

The fillers that are employed in the organopolysiloxane rubber compositions, are known to the art as reinforcing, and semi-reinforcing fillers. The reinforcing fillers, such as the silica fillers, including fumed silica, precipitated silica and the like, are structure inducing and depending upon the manufacture, may contain or be free of hydroxyl groups either in the form of adsorbed moisture, or bonded to silicon atoms. The structure inducing silicone rubber fillers may be modified such as, for example, by the introduction of silicon-bonded alkoxy groups or silicon-bonded alkoxy radicals in place of some hydroxy radicals, resulting in certain advantages, such as decreased structure, when incorporated with a convertible organopolysiloxane composition.

The preferred silica filler of the present invention is fumed silica filler made by fuming processes including the vapor phase burning of silicon tetrachloride or ethyl silicate, an example being what is known to the trade as Cab-O-Sil. Since fumed silica contains a relatively low degree of moisture, it is particularly valuable as a filler in organopolysiloxane rubber which is to be used in electrical applications. Examples of other silica reinforcing fillers may be found described in U.S. patents, 2,541,137, 2,610,167 and 2,657,149. Such fillers may be slightly acidic or alkaline (that is, have pH's below or above 7) depending upon the method of manufacture. Examples of semi-reinforcing or usually non-structure forming type, are titanium oxide, lithopone, calcium carbonate, iron oxide, and diatomaceous earth.

Although the convertible organopolysiloxanes employed in the practice of the present invention are well known in the art, attention is directed to the convertible organopolysiloxanes disclosed in Agens Patent 2,448,756, Sprung et al. Patent 2,448,556, Sprung Patent 2,484,595, Krieble et al. Patent 2,457,688, Marsden Patent 2,521,528, Hyde Patent 2,490,357, and Warrick Patent 2,541,137. It will, of course, be understood by those skilled in the art that the convertible organopolysiloxanes referred to herein can contain the same or different silicon-bonded organic substituents (e.g., methyl, ethyl, propyl, vinyl, allyl, phenyl, tolyl, xylyl, benzyl, phenylethyl, naphthyl, chlorophenyl, cyanoethyl, both methyl and phenyl, etc. radicals) connected to the silicon atoms by carbon-silicon linkages.

The particular convertible organopolysiloxanes used are not critical and can be any one of those described in the foregoing patents. They can be viscous masses or gummy solids depending upon the state of condensation of the starting organopolysiloxanes, polymerizing agent, etc., and can be prepared by condensation of a liquid organopolysiloxane containing an average of about 1.95, preferably from about 1.98 to about 2.01 organic groups per silicon atom. The polymerizing agents that can be employed are well known in the art and include, for instance, ferric chloride hexahydrate, phenyl phosphoryl chloride; alkaline condensing agents such as potassium hydroxide, sodium hydroxide, etc.

Each convertible organopolysiloxane generally comprises a polymeric diorganosiloxane which can contain, if desired, for example, up to 2 mole percent copolymerized monoorganosiloxane, for example, copolymerized monomethylsiloxane and a small molar (e.g., less than 1 mole) percent of triorganosiloxy units, e.g., trimethylsiloxy units. Generally, it is preferred to use as the starting liquid organopolysiloxanes (or mixtures of organopolysiloxanes) from which the convertible organopolysiloxanes are prepared, ones which contain about 1.999 to 2.001, inclusive, organic groups, for example, methyl radicals per silicon atom, and where preferably more than 50 percent, e.g., more than 75 percent, of the silicon atoms in the polysiloxane contain two silicon-bonded lower alkyl, e.g., methyl radicals.

The starting organopolysiloxanes used to make the convertible organopolysiloxanes advantageously comprise organic constituents consisting essentially of the monovalent organic radicals attached to silicon by carbon-silicon linkages, and in which essentially all of the siloxane units consist of units of the structural formula $R_2SiO$, where R is preferably a radical of the group consisting of methyl and phenyl radicals. At least 50 to 75 percent of the total number of R groups are preferably methyl radicals. The polysiloxane can be one in which all the siloxane units are $(CH_3)_2SiO$, or the siloxane can be a copolymer of dimethylsiloxane with a minor amount (e.g., from 1 to 20 or more mole percent) of any of the following units, separately or mixtures thereof: $(C_6H_5)(CH_3)SiO$, $(C_6H_5)_2SiO$ or $(NCCH_2CH_2)(CH_3)SiO$ units. The presence of halogen, e.g., chlorine, atoms on the phenyl nucleus is also within the purview of the present invention.

Where alkenyl radicals are attached to silicon by carbon-silicon linkages, it is preferable that the alkenyl radicals (for instance, vinyl groups, allyl groups, etc.) be present in an amount equal to from 0.05 to 2 mole percent of the total number of organic radicals in the convertible organopolysiloxane that are attached to silicon through carbon-silicon linkages.

Various curing agents to effect more rapid conversion of the convertible organopolysiloxane to the cured, solid, elastic state can be incorporated. Among such curing agents can be mentioned, for instance, benzoyl peroxide, tertiary butyl perbenzoate, bis-(2,4-dichlorobenzoyl) peroxide, etc. These curing agents (or "vulcanization accelerators" as they are often designated) can be present in amounts ranging from about 0.1 to as high as 4 to 8 percent or more, by weight, based on the weight of the convertible organopolysiloxane. High energy electron irradiation, γ radiation, etc. without curing agents, can also be employed for vulcanizing purposes.

The aryl urethane can be incorporated into the convertible organopolysiloxane formulation in any desired manner. The aryl urethane can be added directly into the organopolysiloxane polymer, into the polymer and filler mixture, or, if desired, can be added along with the filler into the polymer. It has been found expedient to add the aryl urethane prior to the addition of the curing catalyst to achieve optimum results.

Addition of a suitable curing agent can be performed at any stage of the processing but it is often desirable to add it after mixing the convertible organopolysiloxane with the filler and the aryl urethane. Thereafter, the composition can be molded or used in any application desired. When molding the curable organopolysiloxane formulation, pressures from about 100 to 2,000 p.s.i. or more can be employed in combination with temperatures ranging from about 80° C. to 200° C. or higher. Under such conditions, the time required for effecting the desired cure will depend upon such factors as the type of curing agent, concentration thereof, the type of organopolysiloxane, the type and amount of filler, the use desired, etc. Persons skilled in the art will have little difficulty in determining the optimum conditions under various situations involving different temperatures, proportions and ingredients.

Suitable convertible organopolysiloxane compositions that are employed in the examples to illustrate the practice of the invention were prepared as follows:

Ninety-eight parts by weight of octamethylcyclopolysiloxane, 2 parts of 1,3,5,7-tetramethyl-1,3,5,7-tetravinylcyclotetrasiloxane and 0.001 part of potassium hydroxide were heated at a temperature of about 155° C. with agitation for about 4 hours to obtain a highly viscous, benzene soluble mass of only slight flow. This "methylvinyl polymer" had an average of approximately 1.98 methyl radicals and 0.02 vinyl radical per silicon atom and a viscosity of about 6 million centistokes.

One hundred parts of octamethylcyclopolysiloxane and 15 parts of octaphenylcyclopolysiloxane were equilibrated in accordance with the above procedure to form what will be referred to in the examples as the "methylphenyl polymer." This polymer had 6 mole percent of phenyl radicals based on the total number of methyl and phenyl radicals in the polymer that were attached to silicon through carbon-silicon linkages.

In order that those skilled in the art may better understand how the present invention can be practiced, the following examples are given by way of illustration and not by way of limitation. All parts are by weight.

EXAMPLE 1

A mixture of 63 parts of the above methylphenyl polymer and 37 parts of fumed silica were milled on a two-roll mill, while 0.25 part of methylene bis(1,4-phenylene-phenyl urethane) was added. When the organopolysiloxane formulation had been thoroughly mixed, 1.3 parts of bis-dichlorobenzoyl peroxide was added. Sheets were molded from the resulting mixture for 10 minutes to about 132° C. and post-cured for 24 hours at 250° C. Strips were cut from the cured sheets which were neutral in color.

EXAMPLE 2

The procedure of Example 1 was repeated, except that 0.3 part of di-tertiarybutyl peroxide on activated aluminosilicate was employed as the curing catalyst, and 1 part of methylene bis(1,4-phenylenephenyl urethane) was utilized.

EXAMPLE 3

A mixture of 65 parts of the methylvinyl polymer, 35 parts of fumed silica and 1 part of titanium dioxide pigment were blended on a two-roll mill, while 1 part of methylene bis(1,4-phenylenephenyl urethane) was added. To the resulting mixture, there was added 0.3 part of ditertiarybutyl peroxide on activated aluminosilicate. Strips were prepared in accordance with the procedure of Example 1. The cured strips were white in color.

Control strips were made from the methylphenyl polymer and methylvinyl polymer in accordance with the procedure of Example 2, that were free of a heat-age additive. The methylvinyl control strips were tinted with standard pigments following the procedure of Example 3. In addition, strips were made that contained red iron oxide as a heat-age additive.

The table below shows the results obtained when the various cured strips were subjected to a severe heat-age treatment for 24 hours at 315° C. The values given in the table were obtained from a standard test procedure where "H" is shore A hardness, "E" is percent elongation, and "T" is tensile strength, p.s.i. Parts in the table represent the parts of additive per 100 parts of the polymer-filler mixture.

Table I

| Polymer | Additive | Parts | Color | Cured 24-Hrs./250°C. | | | Heat-Aged 24-Hrs./315°C. | | |
|---|---|---|---|---|---|---|---|---|---|
| | | | | H | T | E | H | T | E |
| Methylphenyl | None (Control) | | Neutral | 61 | 1,390 | 580 | Too brittle to test | | |
| Do | Aryl Urethane | 0.25 | do | 58 | 1,440 | 610 | 86 | 460 | 40 |
| Do | do | 1 | do | 74 | 1,065 | 270 | 81 | 540 | 100 |
| Do | Iron Oxide | 2 | Red | 70 | 1,265 | 330 | 75 | 440 | 100 |
| Methylvinyl | None (Control) + Pigment (TiO₂, 1 part) | | White | 52 | 900 | 380 | Too brittle to test | | |
| Do | None (Control) + Pigment (Cr₂O₃, 2 parts) | | Green | 60 | 1,110 | 340 | Too brittle to test | | |
| Do | Aryl Urethane + Pigment (TiO₂, 1 part) | 1 | White | 57 | 1,000 | 360 | 70 | 275 | 50 |
| Do | Aryl Urethane + Pigment (Cr₂O₃, 2 parts) | 1 | Green | 57 | 1,110 | 380 | 64 | 700 | 240 |
| Do | Iron Oxide | 2 | Red | 59 | 1,030 | 340 | 62 | 725 | 280 |

The data of the above table clearly illustrates the effectiveness of the color-free aryl urethanes of the present invention in imparting improved heat-age resistance to tinted and color-free organopolysiloxane rubber compositions. Controls that were prepared utilizing conventional pigments in the absence of the aryl urethane heat-age additive, as shown in the table under the methylvinyl polymer, were found to be too brittle to test. As a result of the present invention therefore, there is provided a means of producing color-free and tinted organopolysiloxane rubber compositions having improved resistance to heat-aging.

While the foregoing examples have of necessity been limited to only a few of the very many variables within the scope of the present invention, it should be understood that the present invention covers a much broader class of organopolysiloxane compositions containing the aryl urethanes included within the scope of the present invention. All of these various materials are prepared by methods specifically illustrated in the examples above and described further in the foregoing description of the foregoing invention.

What I claim as new and desire to secure by Letters Patent of the United States is:

1. Organopolysiloxane rubber compositions comprising (1) 100 parts of an organopolysiloxane convertible to the cured, solid, elastic state, (2) 10 to 200 parts of a filler (3) and an effective amount of an aryl urethane that is sufficient to impart to said organopolysiloxane rubber composition an improved resistance to heat-aging, said aryl urethane having the formula:

R'OOCHN—R—NHCOOR' where R is a member selected from the class consisting of divalent arylene radicals halogenated divalent arylene radicals, and bis-arylene substituted alkylene radicals, and R' is a member selected from the class consisting of monovalent aryl radicals and halogenated monovalent aryl radicals, said organopolysiloxane of (1) having a viscosity of at least 100,000 centipoises when measured at 25° C., the organic radicals of said organopolysiloxane being members selected from the class of monovalent hydrocarbon radicals, halogenated monovalent hydrocarbon radicals, and cyanoalkyl radicals, said organic radicals being attached to silicon by carbon-silicon linkages, there being an average of about 1.98 to 2.01 organic radicals per silicon atom.

2. Organopolysiloxane rubber compositions comprising (1) 100 parts of an organopolysiloxane convertible to the cured, solid, elastic state, (2) 10 to 200 parts of a filler (3) and from about 0.1 to 10 parts based on (1) of an aryl urethane having the formula:

R'OOCHN—R—NHCOOR' where R is a member selected from the class consisting of divalent arylene radicals, halogenated divalent arylene radicals, and bis-arylene substituted alkylene radicals, and R' is a member selected from the class consisting of monovalent aryl radicals and halogenated monovalent aryl radicals, said organopolysiloxane of (1) having a viscosity of at least 100,000 centipoises when measured at 25° C., the organic radicals of said organopolysiloxane being members selected from the class of monovalent hydrocarbon radicals, halogenated monovalent hydrocarbon radicals, and cyanoalkyl radicals, said organic radicals being attached to silicon by carbon-silicon linkages, there being an average of about 1.98 to 2.01 organic radicals per silicon atom.

3. A composition in accordance with claim 1, where the aryl urethane is methylene bis(1,4-phenylenephenyl urethane).

4. A composition in accordance with claim 1 that is tinted with a standard pigment.

5. A process of producing an organopolysiloxane rubber composition having improved resistance to heat-aging comprising mixing together (1) an effective amount of an aryl urethane having the formula:

R'OOCHN—R—NHCOOR'

(2) 100 parts of an organopolysiloxane, (3) 10 to 200 parts of a filler (4) and a curing catalyst, and curing the resulting composition at temperatures in the range of 80° C. to 200° C., where R is a member selected from the class consisting of divalent arylene radicals, halogenated divalent arylene radicals, and bis-arylene substituted alkylene radicals, and R' is a member selected from the class consisting of monovalent aryl radicals and halogenated monovalent aryl radicals, said organopolysiloxane having a viscosity of at least 100,000 centipoises when measured at 25° C., the organo radicals of said organopolysiloxanes being members selected from the class consisting of monovalent hydrocarbon radicals, halogenated monovalent hydrocarbon radicals, and cyanoalkyl radicals, there being an average of about 1.98 to 2.01 organo radicals per silicon atom.

References Cited in the file of this patent

UNITED STATES PATENTS 2,945,838     Prober _____ July 19, 1960